US010468889B2

(12) United States Patent
Andrews et al.

(10) Patent No.: US 10,468,889 B2
(45) Date of Patent: Nov. 5, 2019

(54) SHARED POWER FOR POWER DISTRIBUTION MODULES

(71) Applicants: James Christopher Andrews, Mableton, GA (US); Liang Fang, Peachtree City, GA (US); William Lee Shiley, Peachtree City, GA (US); James Moan, Fayetteville, GA (US); Kenneth Dale Walma, Peachtree City, GA (US)

(72) Inventors: James Christopher Andrews, Mableton, GA (US); Liang Fang, Peachtree City, GA (US); William Lee Shiley, Peachtree City, GA (US); James Moan, Fayetteville, GA (US); Kenneth Dale Walma, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 394 days.

(21) Appl. No.: 15/341,815

(22) Filed: Nov. 2, 2016

(65) Prior Publication Data

US 2017/0126016 A1 May 4, 2017

Related U.S. Application Data

(60) Provisional application No. 62/250,831, filed on Nov. 4, 2015.

(51) Int. Cl.
*H02J 4/00* (2006.01)
*H02J 13/00* (2006.01)
(Continued)

(52) U.S. Cl.
CPC ................ *H02J 4/00* (2013.01); *H02J 13/00* (2013.01); *H02M 3/04* (2013.01); *H02M 7/04* (2013.01)

(58) Field of Classification Search
None
See application file for complete search history.

(56) References Cited

U.S. PATENT DOCUMENTS 6,603,218 B1 5/2003 Aisa
2012/0280637 A1* 11/2012 Tikkanen ........... H05B 33/0803 315/294

FOREIGN PATENT DOCUMENTS

RU 2179776 C2 8/2003
WO WO 1998/026489 A1 6/1998
WO WO 2011/029566 A1 3/2011

OTHER PUBLICATIONS

International Search Report for application No. PCT/US2016/060123, dated Feb. 9, 2017.

* cited by examiner

*Primary Examiner* — Thienvu V Tran
*Assistant Examiner* — David M Stables
(74) *Attorney, Agent, or Firm* — King & Spalding LLP

(57) ABSTRACT

A power distribution module (PDM) can include an input portion configured to receive high-voltage (HV) power from a power source. The PDM can also include a power transfer device electrically coupled to the input portion, where the power transfer device is configured to generate at least one low-voltage signal using the HV power. The PDM can further include an output section electrically coupled to the power transfer device and including a number of output channels. The PDM can also include at least one switch disposed between the output section and the power transfer device, where the at least one switch has an open position and a closed position. The PDM can further include a controller communicably coupled to the at least one switch, where the controller operates the at least one switch between (Continued)

the closed position and the open position based on a power demand measured at the output section.

20 Claims, 5 Drawing Sheets

(51) Int. Cl.
*H02M 3/04* (2006.01)
*H02M 7/04* (2006.01)

100
110
102
121
120
123
122
129
104, 106
190
130
109
104,106
104, 106
104,
106
140
150
108

SHARED POWER FOR POWER DISTRIBUTION MODULES

CROSS-REFERENCE TO RELATED APPLICATIONS

This application claims priority under 35 U.S.C. § 119 to U.S. Provisional Patent Application Ser. No. 62/250,831, titled "Shared Power For Power Distribution Modules" and filed on Nov. 4, 2015, the entire contents of which are hereby incorporated herein by reference.

TECHNICAL FIELD

Embodiments described herein relate generally to power distribution systems, and more particularly to systems, methods, and devices for sharing power for power distribution modules.

BACKGROUND

Based on industry standards, circuits fed by power distribution modules are sized based on the peak demand for the load. Since loads rarely run at peak demand, but rather operate most of the time at relatively lower power levels, circuits are oversized during most operating conditions. This results in inefficient use of electrical resources.

SUMMARY

In general, in one aspect, the disclosure relates to a power distribution module (PDM). The PDM can include an input portion configured to receive high-voltage (HV) power from a power source. The PDM can also include a power transfer device electrically coupled to the input portion, where the power transfer device is configured to generate at least one low-voltage (LV) signal using the HV power. The PDM can further include an output section electrically coupled to the power transfer device and having a number of output channels, where each output channel of the output section is configured to deliver the at least one LV signal for use by at least one electrical device. The PDM can also include at least one switch disposed between the output section and the power transfer device, where the at least one switch has an open position and a closed position, where the at least one LV signal flows from the power transfer device to the output section when the at least one switch is in the closed position, and where the at least one LV signal is prevented from flowing from the power transfer device to the output section when the at least one switch is in the open position. The PDM can further include a controller communicably coupled to the at least one switch, where the controller operates the at least one switch between the closed position and the open position based on a power demand measured at the output section.

In another aspect, the disclosure can generally relate to a distributed low voltage power system. The distributed low voltage power system can include a power source generating line voltage power, and a line voltage cable having a first line voltage end and a second line voltage end, where the first line voltage end is coupled to the power source, where the line voltage power flows through the line voltage cable. The distributed low voltage power system can also include a power distribution module (PDM) coupled to the line voltage cable. The PDM can include at least one input channel coupled to the second line voltage end of the line voltage cable. The PDM can also include a power transfer device electrically coupled to the at least one input channel, where the power transfer device receives the line voltage power from the at least one input channel, where the power transfer device generates a first low-voltage (LV) signal from the input power. The PDM can further include at least one first output channel coupled to the power transfer device, where the at least one first output channel receives the first LV signal from the power transfer device. The PDM can also include a controller operatively coupled to the power transfer device and the at least one first output channel, where the controller controls a first amount of the first LV signal delivered to the at least one first output channel. The distributed low voltage power system can further include at least one first electrical device coupled to the at least one first output channel, where the at least one first electrical device operates using the first amount of the first LV signal.

In yet another aspect, the disclosure can generally relate to a controller. The controller can include an energy metering module configured to measure at least one power parameter associated with at least one electrical device. The controller can also include a control engine coupled to the energy metering module, where the control engine regulates, using the at least one power parameter measured by the energy metering module, an amount of power delivered from a power transfer device to a number of electrical devices.

These and other aspects, objects, features, and embodiments will be apparent from the following description and the appended claims.

BRIEF DESCRIPTION OF THE DRAWINGS

The drawings illustrate only example embodiments of shared power for power distribution modules and are therefore not to be considered limiting of its scope, as shared power for power distribution modules may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
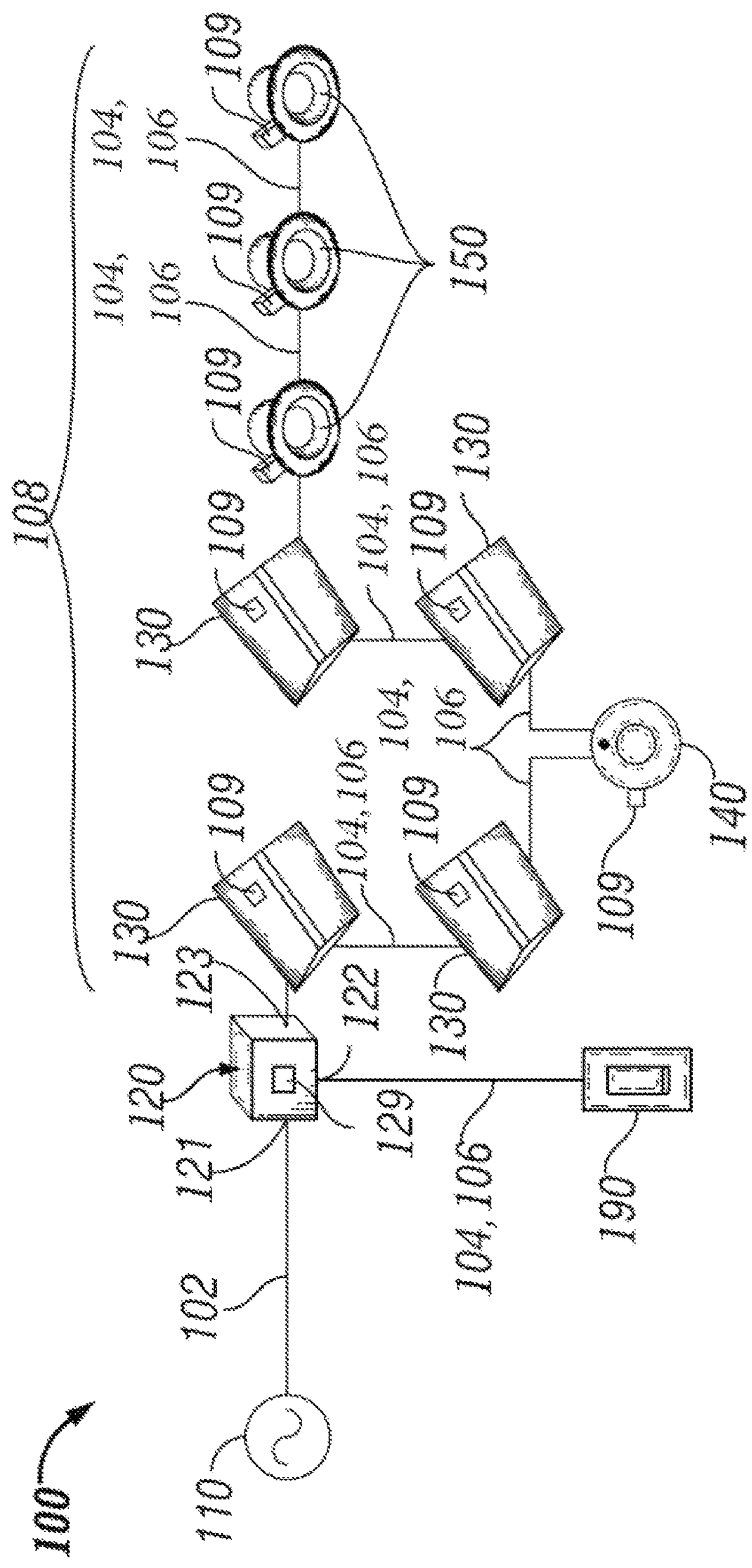
FIG. 1 shows a system diagram of a distributed low voltage power system in accordance with certain example embodiments.

The example embodiments discussed herein are directed to systems, apparatuses, and methods of shared power for power distribution modules (PDMs). While example embodiments described herein are directed to use with low power (e.g., up to 100 VAC, no more than 60 VDC) PDMs, example embodiments can also be used in higher voltage PDMs. Further, while PDMs described herein are self-contained units, example embodiments can be used with PDMs that are distributed and/or made of a number of discrete components. Thus, example embodiments are not limited to use with low power, self-contained PDMs.

Example embodiments can be used with one or more of any number of low voltage system infrastructures. For instance, example embodiments can use Ethernet cables coupled to output channels of a Power-Over-Ethernet (POE) switch, where the PDM (defined below) acts as the POE switch. As an alternative to this example, the example secondary power supply can act as the POE switch. As another example, the example secondary power supply (or a PDM coupled to the secondary power supply) can serve as a gateway, where multiple devices are connected to the output channels of the secondary power supply and/or PDM. In this way, the secondary power supply or the PDM can act as a point-of-load (POL) controller, described below. As yet another example, the example secondary power supply (or a PDM coupled to the secondary power supply) can act as a gateway, which in turn can cause the POL or the PDM to act as a POL controller.

As described herein, a user can be any person that interacts with example power distribution modules. Examples of a user may include, but are not limited to, a consumer, an electrical transmission system operator, an electrical distribution system operator, an electrical generator, a homeowner, a tenant, a business owner, a manufacturer, a building owner, an electrician, an engineer, a mechanic, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

In certain example embodiments, the systems (or portions thereof) that include shared power for PDMs described herein meet one or more of a number of standards, codes, regulations, and/or other requirements established and maintained by one or more entities. Examples of such entities include, but are not limited to, Underwriters' Laboratories (UL), the National Electric Code (NEC), the Institute of Electrical and Electronics Engineers (IEEE), and the National Fire Protection Association (NFPA). For example, wiring (the wire itself and/or the installation of such wire) that electrically couples an example PDM (defined below) with a device may fall within one or more standards set forth in the NEC. Specifically, the NEC defines Class 1 circuits and Class 2 circuits under various Articles, depending on the application of use. As another example, UL924 establishes standards for emergency power lighting systems. As yet another example, NFPA 101 establishes standards and protocols during power outages.

Class 1 circuits under the NEC typically operate using line voltages (e.g., between 120 VAC and 600 VAC). The wiring used for Class 1 circuits under the NEC must be run in raceways, conduit, and enclosures for splices and terminations. Consequently, wiring for Class 1 circuits must be installed by a licensed electrical professional. By contrast, Class 2 circuits under the NEC typically operate at lower power levels (e.g., up to 100 VAC, no more than 60 VDC). The wiring used for Class 2 circuits under the NEC does not need to be run in raceways, conduit, and/or enclosures for splices and terminations. Specifically, the NEC defines a Class 2 circuit as that portion of a wiring system between the load side of a Class 2 power source and the connected equipment. Due to its power limitations, a Class 2 circuit is considered safe from a fire initiation standpoint and provides acceptable protection from electrical shock. Consequently, wiring for Class 2 circuits can be installed by someone other than a licensed electrical professional.

As another example, the International Electrotechnical Commission (IEC) sets and maintains multiple standards and categorizations of electrical supply for a system. One such categorization is separated or safety extra-low voltage (SELV) is an electrical system in which the voltage cannot exceed 25 V AC RMS (root-mean-square) (35 V AC peak) or 60 V DC under dry, normal conditions, and under single-fault conditions, including earth faults in other circuits. Another such categorization, protected extra-low voltage (PELV), is an electrical system in which the voltage cannot exceed 25 V AC RMS (35 V AC peak) or 60 V DC under dry, normal conditions, and under single-fault conditions, except earth faults in other circuits. Yet another such categorization, functional extra-low voltage (FELV), is an electrical system in which the voltage cannot exceed 25 V AC RMS (35 V AC peak) or 60 V DC under normal conditions.

As defined here, the term "low voltage" can be a level of voltage that is suitable for use in a Class 2 circuit. For example, a low voltage (LV) signal (discussed below) can have a voltage that does not exceed approximately 42.4 VAC (root mean square) or 60 VDC. Example embodiments of shared power for PDMs can be used to provide power to one or more LV devices (defined below) that are part of a Class 2 circuit. In addition, or in the alternative, example embodiments of shared power for PDMs can be used to provide power to one or more devices that are part of a Class 1 circuit.

Example embodiments of shared power for PDMs will be described more fully hereinafter with reference to the accompanying drawings, in which example embodiments of shared power for PDMs are shown. Shared power for PDMs may, however, be embodied in many different forms and should not be construed as limited to the example embodiments set forth herein. Rather, these example embodiments are provided so that this disclosure will be thorough and complete, and will fully convey the scope of shared power for PDMs to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation, and are not meant to limit embodiments of shared power for PDMs. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a distributed power system 100 that includes a PDM 120 in accordance with certain example embodiments. The system 100 of FIG. 1 includes the PDM 120, a power source 110, a number (in this case, four) of troffer lights 130, a number (in this case, three) of can lights 150, a number (in this case, one) of sensing devices 140, and a number (in this case, one) of controllers 190. The power source 110 is coupled to the PDM 120 using one or more line voltage cables 102. The PDM 120 and all of the other components of the system 100 are electrically coupled (directly or indirectly) to each other by a number of low-voltage (LV) cables 104.

In addition, or in the alternative, the PDM 120 can be coupled to one or more components (e.g., the controller 190, a LV device 108) of the system 100 using one or more communication links 106. The communication link 106 can include a LV cable 104, Ethernet cable, and/or some other wired technology. In addition, or in the alternative, the communication link 106 can include a network using wireless technology (e.g., Wi-Fi, Zigbee, 6LoPan). The controller 190 can be coupled to one or more other systems in addition to the PDM 120 of the system 100. Similarly, the PDM 120 can be coupled to one or more other PDMs in one or more other systems. The system 100 can have multiple PDMs 120, where each PDM 120 of the system 100 provides LV power and communicates (sends and receives data) with each other, a controller 190, and/or one or more LV devices 108. In some cases, the controller 190 can be part of the PDM 120 rather than a separate component of the system 100.

Operational components of the system 100 (or any system described herein), such as the troffer lights 130, the can lights 150, and the sensing devices 140, can be referred to generally as "LV devices 108". The example LV devices 108 shown in FIG. 1 are not meant to be limiting. Examples of other LV devices 108 that can receive and use (directly or indirectly) LV signals from the PDM 120 can include, but are not limited to, a power source (e.g., a LED driver, a ballast, a buck converter, a buck-boost converter), a controller (e.g., a pulse width modulator, a pulse amplitude modulator, a constant current reduction dimmer), a keypad, a touchscreen, a dimming switch, a thermostat, a shade controller, a universal serial bus charger, and a meter (e.g., water meter, gas meter, electric meter).

The sensing device 140 can be any device that detects one or more conditions. Examples of a sensing device 140 can include, but are not limited to, a photocell, a motion detector, an audio detector, a pressure detector, a temperature sensor, and an air flow sensor. The controller 190 can be any device that controls one or more of the other devices in the system 100. Examples of a controller 190 can include, but are not limited to, a thermostat, a dimmer switch, a control switch, a control panel, and a power switch.

The power source 110 generates and/or delivers electrical power (called line voltage power herein) to the PDM 120. The line voltage power is at a higher voltage (and in some cases a different type (e.g., DC voltage, AC voltage)) than the voltage delivered by the PDM 120 to the various LV devices (e.g., troffer lights 130, can lights 150, sensing device 140) in the system 100. The line voltage power is a power that is typically delivered to a house, building, or other similar structure that supplies electricity located within or proximate to such structure. The power source 110 can also generate DC power.

Examples of voltages generated by the power source 110 can include 120 VAC, 240 VAC, 277 VAC, and 480 VAC. If the line voltage power is AC power, the frequency can be 50 Hz, 60 Hz, or some other frequency. Examples of a power source 110 can include, but are not limited to, a battery, a solar panel, a wind turbine, a power capacitor, an energy storage device, a power transformer, a fuel cell, a generator, and a circuit panel. As defined herein, a line voltage includes any of a number of voltages that is typically at least as great as the maximum LV signal (described below), and that is typically a nominal service voltage such as 120 VAC, 277 VAC, or 480 VDC.

The line voltage power is sent, directly or indirectly, from the power source 110 to the PDM 120 using the line voltage cables 102. The line voltage cables 102 can include one or more conductors made of one or more electrically conductive materials (e.g., copper, aluminum). The size (e.g., gauge) of the line voltage cables 102 (and/or conductors therein) are sufficient to carry the line voltage power of the power source 110. Each line voltage cable 102 may be coated with an insulator made of any suitable material (e.g., rubber, plastic) to keep the electrical conductors electrically isolated from any other conductor in the line voltage cable 102.

In certain example embodiments, one or more of the LV devices 108 (in this case, the light troffers 130, the can lights 150, the sensing device 140, and the controller 190) in the system 100 that receive the LV power from the PDM 120 use an amount and/or type (e.g., DC, AC) of power that is different from the amount and type of line voltage power generated by the power source 110. For example, the line voltage power can be AC power, and the LV devices 108 of the system 100 require DC power to operate. In some cases, if the PDM 120 does not convert the line voltage power to the specific amount and/or type required by one or more LV devices 108, the LV device 108 can include a local power transfer device (not shown).

A local power transfer device can be used to receive LV power from a LV cable 104 and to output the appropriate LV power (also called a LV signal) that can be used by the associated LV device 108. Other examples of a LV device 108 can include, but are not limited to, cloud storage, a mobile device, a local area network (LAN), a wide area network (WAN), a projector, a control panel, a window shade control device, a thermostat, a computing device, a printing device, and an exit sign, The aforementioned power transfer device can be substantially similar to the power transfer device 129 of the PDM 120, described below. The power transfer device can include one or more of a number of components that alter the amount and/or a type of the line voltage power. Such components can include, but are not limited to, a transformer (for raising or lowering a level of AC power), a rectifier (for generating DC power from AC power), and an inverter (for generating AC power from DC power). The power transfer device can include solid state components and/or discrete components (e.g., resistors, capacitors, diodes).

In some cases, a power transfer device associated with a LV device can be called a point-of-load (POL) control device 109. Each POL control device 109 (also called, among other names, a driver or a ballast) is usually located within a housing of the LV device 108 and is designed to receive a LV signal. When a LV signal is received by the POL control device 109, the POL control device 109 provides power regulation and control to the LV device 108. Each POL control device 109 currently used in the art has only a single output channel, and so only enables a single function (e.g., dimming, enable a particular color light) of a single LV device 108.

As stated above, the various LV devices 108 of FIG. 1 are each electrically coupled, directly or indirectly, to the PDM 120 using one or more LV cables 104. The PDM 120 can include a power transfer device 129 that generates, using the line voltage signal generated by the power source 110, one or more of a number of LV signals for one or more of the LV devices 108 in the system 100. The PDM 120 can have an input portion (e.g., input channel 121), an output portion (e.g., output channel 122, output channel 123), and the power transfer device 129. The power transfer device 129 of the PDM 120 can be essentially the same as the power transfer device 109 described above for the LV devices 108.

In certain example embodiments, the input portion of the PDM 120 can include one or more input channels 121 that receive the line voltage power from the power source 110. When the PDM 120 has multiple input channels 121, each input channel 111 can have the same, or different, amount and/or type of line voltage as the other input channels 121 of the PDM 120. The output portion of the PDM 120 can include one or more of a number (e.g., one, two, five, ten) of output channels (e.g., output channel 122, output channel 123), where each output channel (also called an outlet channel) of the output section delivers one or more LV signals for use by one or more LV devices 108 of the system 100 that are electrically coupled to that output channel of the output portion of the PDM 120.

The amount and/or type of power of the LV signal of one output channel of the PDM 120 can be substantially the same as, or different than, the amount and/or type of power of the LV signal of another output channel of the output portion of the PDM 120. For example, each output channel of the PDM 120 can output 100 W, 48 VDC of power (also called the LV signal). The LV signals delivered by an output channel of the PDM 120 can be at a constant level and/or a variable level. The LV signals can change a state (e.g., on, off, dim, standby) of one or more devices. In addition, or in the alternative, the LV signal can send data (e.g., instructions, requests, information, status).

In certain example embodiments, one or more LV cables 104 are used to electrically couple, directly or indirectly, each of the LV devices 108 in the system 100 to the PDM 120. The LV cables 104 can have one or more pairs of conductors. Each pair of conductors of the LV cable 104 can deliver LV signals that represent power signals and/or communication signals. In some cases, a LV cable 104 has at least one pair of conductors that carries power signals and at least one pair of conductors that carries control signals. The LV cables 104 can be plenum rated. For example, one or more of the LV cables 104 can be used in drop ceilings without conduit or cable trays.

The PDM 120 can also communicate, using an output channel (in this case, output channel 122) with one or more controllers 190 using a communication link 106. In such a case, the controller 190 can communicate with (e.g., send instructions to, receive data about one or more LV devices 108 from) the PDM 120. Instructions sent by the controller 190 to the PDM 120 can affect the operation of all devices coupled to one or more particular channels of the PDM 120, particular devices coupled to one or more particular channels of the PDM 120, or any combination thereof. Communication between the PDM 120, the controller 190, and the controllers in one or more devices of the system 100 can include the transfer (sending and/or receiving) of data. Communications between the PDM 120, the controller 190, and/or a LV device 108 can be made through the LV cables 104 and/or the communication link 106, using wired and/or wireless technology.

Such data can include instructions, status reports, notifications, and/or any other type of information. Specific examples of data and/or instructions sent between the PDM 120, the controller 190, and/or a LV device 108 can include, but are not limited to, a light level, a light fade rate, a demand response, instantaneous power consumption of a LV device 108, occupancy of an area, detection of daylight, a security override, a temperature, a measurement of power, a measurement or calculation of power factor, operational status, a mode of operation, a dimming curve, a color and/or correlated color temperature (CCT), a manual action, manufacturing information, performance information, warranty information, air quality measurements, upgrade of firmware, update of software, position of a shade, an a device identifier.

Communications between the PDM 120, the controller 190, and/or a LV device 108 can be based on one or more of a number of factors. For example, communications can be based on an algorithm or formula set forth in software and/or hardware within one or more components of the system 100. As another example, communications can be based on events associated with a LV device 108 or other component of the system. Such events can include, but are not limited to, change in power consumption, light intensity, an emergency condition, demand response, passage of time, and a time sweep.

In certain example embodiments, the PDM 120 can include communication and diagnostic capabilities. Communications can be with the controller 190, one or more devices coupled to the PDM 120, other PDMs 120 in the system 100, a user device, and/or any other component of the system 100. Diagnostic capabilities can be for historical and instantaneous power consumption of the LV devices 108 associated with a particular output channel of the PDM 120, for operations of the system 100 overall, for operations of the PDM 120, for operations of one or more LV devices 108 coupled to the PDM 120, for operations of one or more other PDMs in the system 100, and/or for any other components of the system 100.

The PDM 120, the controller 190, and/or the POL controllers 109 of one or more LV devices 108 can include a hardware processor-based component that executes software instructions using integrated circuits, discrete components, and/or other mechanical and/or electronic architecture. In addition, or in the alternative, the PDM 120, the controller 190, and/or the POL controllers 109 of one or more LV devices 108 can include one or more of a number of non-hardware-based components. An example of such a non-hardware-based component can include one or more field programmable gate arrays (FPGA), one or more insulated-gate bipolar transistors (IGBTs), and/or one or more integrated circuits (ICs).

Using FPGAs, IGBTs, ICs, and/or other similar devices known in the art allows the PDM 120, the controller 190, and/or the POL controllers 109 of one or more LV devices 108 to be programmable and function according to certain logic rules and thresholds without the use, or with limited use, of a hardware processor. As discussed below, the PDM 120 can also have one or more of a number of other hardware and/or software components, including but not limited to a storage repository, memory, an application interface, and a security module. Similarly, the controller 190 and/or a POL control module 109 of one or more LV devices 108 in the system 100 can include one or more software and/or hardware components, including but not limited to those listed above for the PDM 120.

Figure 2:
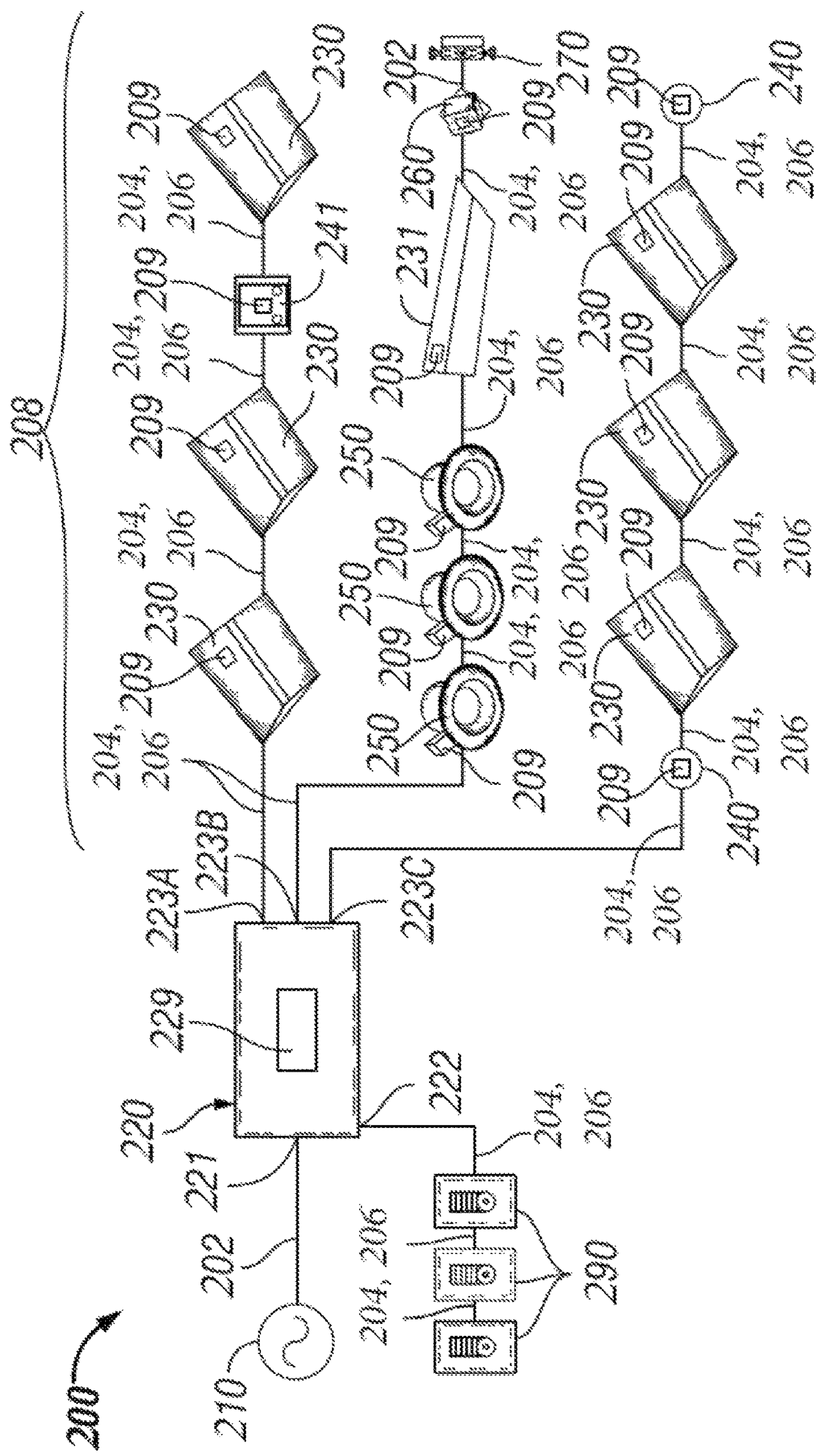
FIG. 2 shows a system diagram of another distributed low voltage power system in accordance with certain example embodiments.

FIG. 2 shows a system diagram of yet another distributed low voltage power system in accordance with certain example embodiments. Referring to FIGS. 1 and 2, the system 200 of FIG. 2 is substantially the same as the system 100 of FIG. 1, except that the PDM 220 that has four output channels (in this case, output channel 222, output channel 223-1, output channel 223-3, and output channel 223-3) instead of two. One output channel 223A of the PDM 220 provides LV signals in series to two troffer lights 235, a photocell/timer 451, and another troffer light 235. Another output channel 223B of the PDM 220 provides LV signals in series to three can lights 250, a different troffer light 231, and an inverter 260, which feeds AC power to a wall outlet 270 using a line voltage cable 202. The third output channel 223C of the PDM 220 provides LV signals in series to a motion sensor 240, three light troffers 235, and another motion sensor 240. The final output channel 222 is coupled to three controllers 290 connected in series using communication links 206.

Figure 3:
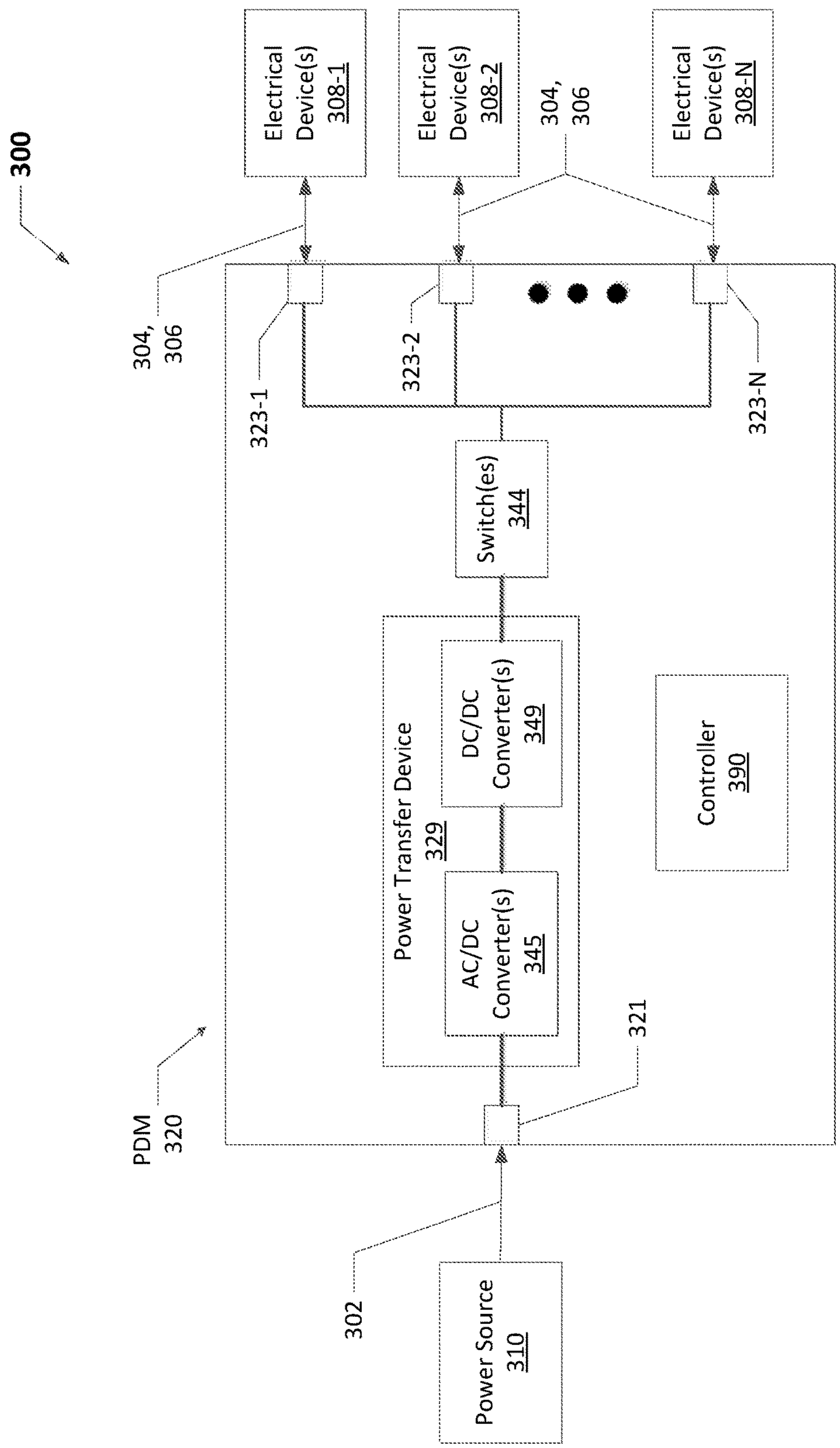
FIG. 3 shows a system diagram that includes a power distribution module in accordance with certain example embodiments.

FIG. 3 shows a system diagram 300 that includes a power distribution module 320 in accordance with certain example embodiments. Referring to FIGS. 1-3, the system 300 of FIG. 3 is substantially the same as the system 200 of FIG. 2, except that FIG. 3 shows more detail of the PDM 320. As explained above, under certain industry standards (e.g., NEC, UL), the "size" (the maximum allowable voltage) of the load (in this case, electrical devices 308) is based on the maximum power that can be consumed by that load. The PDM 320 has multiple output channels 323 (e.g., 323-1, 323-2, and 323-N) that each feed a load of one or more electrical devices 308 (e.g., electrical device(s) 308-1, electrical device(s) 308-2, electrical device(s) 308-N) with up to 100 W per output channel 323. In order to comply with industry standards, the power source 310 delivering the line power voltage on line voltage cables 302 to the input channel 321 of the PDM 320 is thus sized in this case to equate to 300 W delivered by the PDM 320 to the output channels 323.

A major issue is that the electrical devices 308 operate in steady state conditions at a far lower power level (e.g., 50% less) compared to the maximum amount of power that the electrical device 308 can require. Further, when an electrical device 308 does require a maximum amount of power, this need often only lasts for no more than a few seconds before the electrical device 308 requires significantly less power to operate.

In addition, there is often an additional safety factor (e.g., 80%) applied to the calculations of maximum load for a circuit, which further amplifies the capacity factor of a circuit during steady state operations. For example, a 20 A circuit allows for 16 A of designed maximum current draw when a safety factor of 80% is applied. To further compound the issue, with LED loads and/or other loads that use DC power, the nameplate of the power transfer device 329 of a circuit that converts AC power to DC power can have an additional safety factor that further limits the power delivered to the DC load (e.g., electrical devices 308).

The power transfer device 329 in this case includes an AC/DC converter 345 and one or more DC/DC converters 349. The AC/DC converter 345 receives the line voltage power at the input channel 321 of the PDM 320 from the power source 310 using one or more line voltage cables 302. In such a case, the line voltage power is AC power. The AC/DC converter 345 receives the line voltage power and transforms the line voltage power to DC power, which is sent to one or more of the DC/DC converters 349. Each DC/DC converter 349 receives the DC power from the AC/DC converter 345 and transforms (e.g., raises, lowers) the DC power to a level that is used by one or more LV devices 308 coupled to the output channel 323 associated with the PDM 320.

The PDM 320 of FIG. 3 also includes one or more of a number of switches 344 that are disposed between the outlet channels 323 and the power transfer device 329 of the PDM 320. Each switch 344 has an open position (also sometimes called an open state) and a closed position (also sometimes called a closed state). When a switch 344 is in the closed position, a closed circuit is created so that the switch 344 allows power to pass through it from the power transfer device 329 to one or more outlet channels 323. When a switch 344 is in an open position, an open circuit is created so that the switch 344 prevents power from the power transfer device 329 from flowing to any outlet channels 323 that are coupled to the switch 344. In certain example embodiments, the position of each switch 344 is controlled by the controller 390.

A switch 344 can be used to provide an open or closed circuit with respect to one or more output channels 323. For example, in this case, if there is one switch 344, the switch 344 can prevent the delivery of power from the power transfer device 329 to any of the output channels 323 that are coupled to the switch 344. A switch 344 can be coupled to a single output channel 323 or to multiple output channels 323. When there are multiple switches 323, those switches 323 can be positioned in series and/or in parallel with each other.

In some cases, in addition to or in the alternative of being disposed between the power transfer device 329 and the output channels 323, one or more switches 344 can be positioned between the input channel 321 and the power transfer device 329 and/or within the power transfer device 329. For example, one or more switches 344 can be disposed between an AC/DC converter 345 and one or more DC/DC converters 349. As another example, one or more switches 344 can be disposed between the input channel 321 and the power transfer device 329.

Further, one or more switches 344 can be place in one or more other locations in the system 300. For example, one or more switches 344 can be integrated with a POL control device (e.g., POL control device 209). In such a case, the controller 390 can send a signal to the POL control device to operate the one or more switches 344 to more locally isolate and/or incorporate one or more electrical devices 308 associated with the POL control device. More information about the switches 344 is provided below with respect to FIG. 4.

As a specific example, assume that the PDM 320 has 10 output channels of 100 W of Class 2 load (in this case, electrical devices 308) each. Under the current art (e.g., the PDM 320 of FIG. 3 without the controller 390 and associated switches 344), if the input channel 321 of the PDM 320 is rated for 4 A maximum at 277 VAC, each 100 W output channel 323 of the PDM 320 could only support a single electrical device 308 in the form of a 51 W LED luminaire, accounting for peak demand of the electrical device 308, a safety factor, and converting AC power to DC power. In other words, the total load that could be supported by the output channels 323 of the PDM 320 using the current art is 510 W, even though the output channels 323 of the PDM 320 have a capacity of 1000 W.

By contrast, when the PDM 320 includes a controller 390 and associated switches 344, as shown in FIG. 3 and described in more detail below with respect to FIG. 4, the PDM 320 can operate under a shared power function. In such a case, each output channel 323 would be limited to 100 W, and any unused portion of the 100 W of power by one output channel 323 is available to be shared by one or more of the other output channels 323 of the PDM 320. In this way, a PDM 320 could have a greater number of output channels 323, each limited to 100 W, and still remain under Class 2 requirements. Alternatively, each output channel 323 could have additional load (e.g., additional electrical devices 308, electrical devices 308 with a higher capacity).

To enable this shared power function of the PDM 320, the controller 390 actively monitors (e.g., using an energy metering module, described below with respect to FIG. 4) and reallocates (e.g., by operating one or more of the switches 344) available power to optimize utilization of the power as opposed to taking a modular approach currently used in the art. In certain example embodiments, this monitoring and/or reallocation can occur continuously or upon the occurrence of a condition (e.g., passage of time, number of hours of operation of an electrical device 308).

Specifically, by using a controller 390 and associated switches 344 with the PDM 320, the PDM 320 has 10 output channels of 100 W of Class 2 load (in this case, electrical devices 308) each. In this case, using the controller 390 and the switches 344, if the input channel 321 of the PDM 320 is rated for 4 A maximum at 277 VAC, the ten 100 W output channels 323 of the PDM 320 could support a total of 19 electrical devices 308 in the form of a 51 W LED luminaire, accounting for steady-state demand of the electrical devices 308, the safety factor, and converting AC power to DC power. In other words, the total load that could be supported by the output channels 323 of the PDM 320 is 969 W, which is nearly all of the 1000 W capacity of the ten output channels 323 of the PDM 320.

In other words, using example embodiments, nearly twice the load (19 electrical devices 308) can be powered by the PDM 320 compared to the load (10 electrical devices 308) powered by a PDM 320 without an example controller 390. As a result, example embodiments allow for a reduction in labor and materials (e.g., breaker panels, wiring, PDMs, conduit) for installation and maintenance. The example controller 390, using the associated switches 344, can manage the active loads (electrical devices 308) being served by the PDM 320 so that, when the total demand at a point in time exceeds the maximum rating (in this case, 1000 W), the controller 390 can identify the electrical device 308 causing the surge, reduce the power delivered to one or more other electrical devices 308 (e.g., by operating one or more switches 344) to manage the overall power consumed by all of the electrical devices 308, and return (e.g., by operating one or more switches 344) the affected electrical devices 308 back to their normal, steady-state operating levels when the surge in power has ended.

Figure 4:
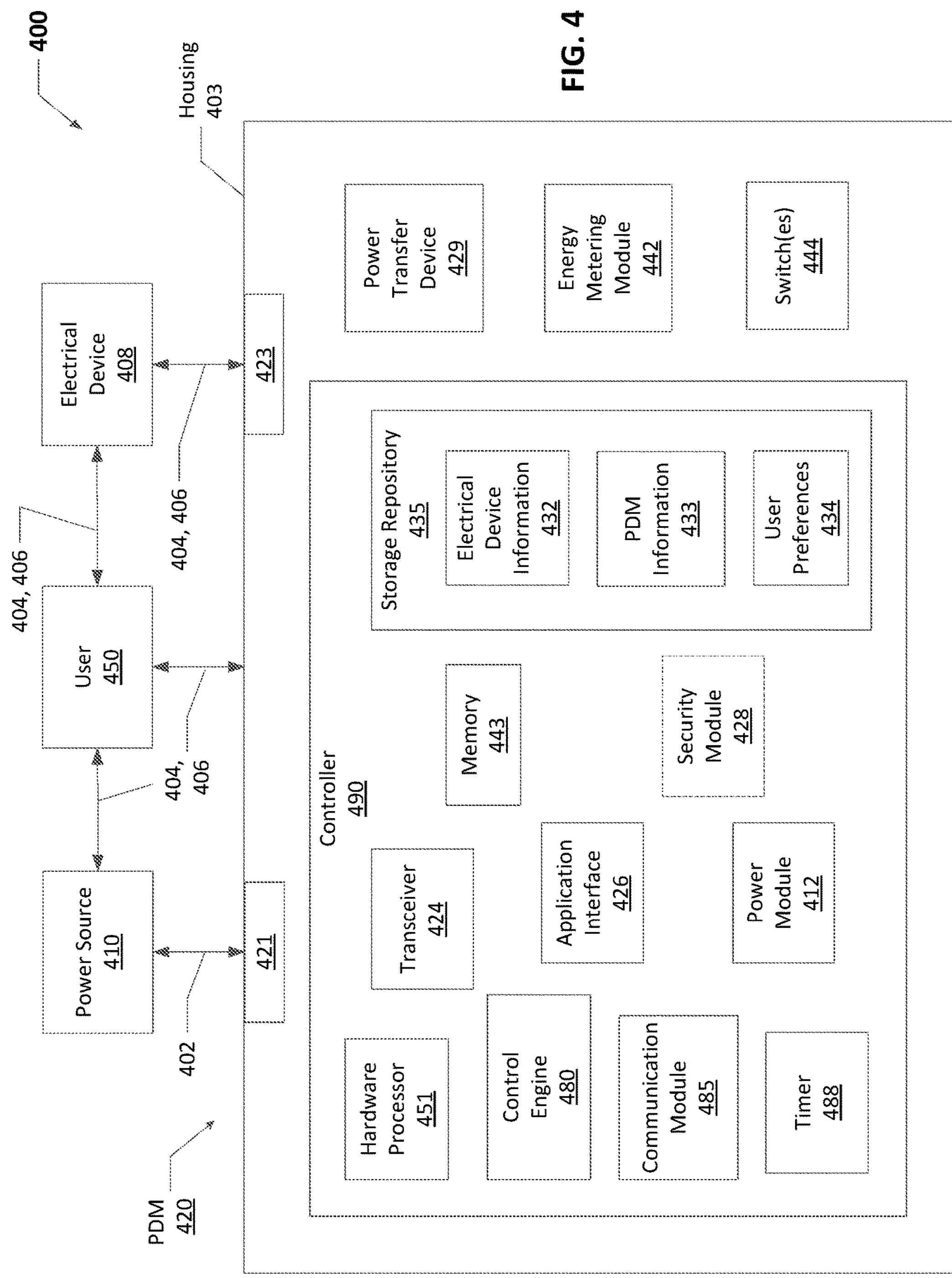
FIG. 4 shows a system diagram that includes a PDM with a controller in accordance with certain example embodiments.

FIG. 4 shows a system diagram 400 that includes a PDM 420 with a controller 490 in accordance with certain example embodiments. In addition to the PDM 420, the system 400 of FIG. 4 can include one or more electrical devices 408, a user 450, and one or more power sources 410. In addition to the controller 490, the PDM 420 can include a power transfer device 429, one or more switches 444, and one or more energy metering module 442. The controller 490 can include one or more of a number of components. Such components, can include, but are not limited to, a control engine 480, a communication module 485, a timer 488, a power module 412, a storage repository 435, a hardware processor 451, a memory 442, a transceiver 424, an application interface 426, and, optionally, a security module 428.

The components shown in FIG. 4 are not exhaustive, and in some embodiments, one or more of the components shown in FIG. 4 may not be included in an example PDM 420. Any component of the example PDM 420 can be discrete or combined with one or more other components of the PDM 420. In addition, the location of one or more components can vary from what is shown in FIG. 4. For example, the PDM 420 may not have a local controller 490 disposed, at least in part, within the housing 403 of the PDM 420. Instead, the controller 490 can be located remotely from the PDM 420 and communicate with the PDM 420 using LV cables 404 and/or communication links 406. As another example, one or more of the switches 444 can be part of the controller 490 and/or the energy storage device 429.

The user 450 is the same as a user defined above. The user 450 interacts with (e.g., sends data to, receives data from) the controller 490 of the PDM 420 via the application interface 426 (described below). The user 450 can also interact with the power source 410 and/or one or more electrical devices 408. Interaction between the user 450 and the PDM 420, the power source 410, and the electrical devices 408 can be conducted using communication links 406. The communication links 406 can transmit signals (e.g., communication signals, control signals, data) between the PDM 420 and the user 450, the power source 410, and/or one or more of the electrical devices 408.

An electrical device 408 can be any device that operates using a form of electrical energy. An electrical device 408 can be a single electrical device, or a grouping of electrical devices. Each electrical device 408 can use one or more of a number of communication protocols. Examples of an electrical device 408 can include, but are not limited to, a wall switch, an electrical receptacle, a HVAC unit, a shade control device, and a light fixture. In other words, an electrical device 408 can be a LV device, as described above with respect to FIGS. 1 and 2.

An electrical device 408 can include and/or be coupled to the controller 490 and/or the PDM 420. The one or more energy metering module 442 of the PDM 420 can monitor conditions of the electrical device 408. Examples of such conditions can include, but are not limited to, power consumption of the electrical device 408 and setting (e.g., dimming level, switch setting) of the electrical device 408. In certain example embodiments, an electrical device 408 is coupled to an output channel 423 of the PDM 420, and the energy metering module 442 measures power fed through the output channel 423. The electrical device 408 can be one or more electrical devices 408 that are coupled (e.g., in series, in parallel) to one of the output channels 423 of the PDM 420.

The energy metering module 442 of the controller 490 measures one or more components of power (e.g., current, voltage, resistance, VARs, watts) associated with the PDM 420 and/or the electrical devices 408 at one or more points in the system 400. For example, the energy metering module 442 can measure the power consumption of the electrical devices 408 at one or more output channel 423. The energy metering module 442 can include any of a number of measuring devices and related devices, including but not limited to a voltmeter, an ammeter, a power meter, an ohmmeter, a current transformer, a potential transformer, and electrical wiring. The energy metering module 442 can measure a component of power continuously, periodically, based on the occurrence of an event, based on a command received from the control engine 480, randomly, and/or based on some other factor. The energy metering module 442 and/or other components of the PDM 420 can receive power, control, and/or communication signals from the power transfer device 429, in addition to or in the alternative of the power module 412.

Each switch 444 can be any type of device that changes state or position (e.g., opens, closes) based on certain conditions. Examples of a switch 444 can include, but are not limited to, a transistor, a dipole switch, a relay contact, a resistor, and a NOR gate. In certain example embodiments, each switch 444 can operate (e.g., change from a closed position to an open position, change from an open position to a closed position) based on input (e.g., signals) received from the controller 490.

The power transfer device 429 can be substantially the same as the power transfer devices described above. Examples of a power transfer device 429 can include, but are not limited to, a driver and a ballast. The power transfer device 429 can be a source of independent power generation (an independent power source 410). For example, the power transfer device 429 can include an energy storage device (e.g., a battery, a supercapacitor). As another example, the power transfer device 429 can include photovoltaic solar panels. In addition, or in the alternative, the power transfer device 429 can receive power from the power source 410. The power source 410 can be any source of power that is independent of the power transfer device 429. Examples of a power source 410 can include, but are not limited to, an energy storage device, a feed to a building, a feed from a circuit panel, and an independent generation source (e.g., photovoltaic panels, a heat exchanger).

In certain example embodiments, the power transfer device 429 sends power, control, and/or communication signals to, and receives power, control, and/or communication signals from, the controller 490 of the PDM 420. In this way, the controller 490 of the PDM 420 controls the power transfer device 429 (and, thus, the energy metering module 442) of the PDM 420.

The controller 490 of a PDM 420 can interact (e.g., periodically, continually, randomly) with an electrical device 408, the power source 410, and/or the user 450. The user 450, the power source 410, and/or the electrical devices 408 can interact with the controller 490 of the PDM 420 using the application interface 426 and the communication links 406 in accordance with one or more example embodiments. Specifically, the application interface 426 of the controller 490 receives data (e.g., information, communications, instructions) from and sends data (e.g., information, communications, instructions) to the user 450, the power source 410, and/or the other electrical devices 408.

The controller 490, the user 450, the power source 410, and/or the electrical devices 408 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 490. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 5.

Further, as discussed above, such a system can have corresponding software (e.g., user software, controller software, power source software, electrical device software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments (communication links 406) according to some example embodiments. The software of one system can be a part of, or operate separately but in conjunction with, the software of another system within the system 400.

As discussed above, the PDM 420 can include a housing 403. The housing 403 can include at least one wall that forms a cavity. The housing 403 of the PDM 420 can be used to house, at least in part, one or more components (e.g., power transfer device 429, energy metering module 442, controller 490) of the PDM 420, including one or more components of the controller 490. For example, as shown in FIG. 4, the controller 490 (which in this case includes the control engine 480, the communication module 485, the timer 488, the storage repository 435, the hardware processor 451, the memory 443, the transceiver 424, the application interface 426, and the optional security module 428) can be disposed within the cavity formed by the housing 403. In alternative embodiments, any one or more of these or other components of the PDM 420 can be disposed on the housing 403 and/or remotely from the housing 403.

The storage repository 435 can be a persistent storage device (or set of devices) that stores software and data used to assist the controller 490 in communicating with the user 450, the power source 410, and one or more electrical devices 408 within the system 400. In one or more example embodiments, the storage repository 435 stores optional electrical device information 432, PDM information 433, and user preferences 434. The electrical device information 432 can be any information associated with an electrical device 408. Such information can include, but is not limited to, manufacturer's information of the electrical device 408, age of the electrical device 408, hours of operation of the electrical device 408, historical peak demand of the electrical device 408, historical energy usage of the electrical device 408 during steady-state operation, communication protocols of the electrical device 408, physical location of the electrical device 408, and orientation of the electrical device 408.

The electrical device information 432 can also include comparative information with respect to one or more electrical devices 408 in the system 400. For example, the electrical device information 432 can include a prioritization (e.g., in terms of criticality of function, in terms of minimum output required to effectively operate) of one or more of the electrical devices 408 in the system 400. In such a case, the controller 490 can use such information to determine which switch 444 to operate in order to add and/or remove service (delivery of power) to a particular electrical device 408 to keep the total power demand (the sum of usages across all output channels 423) at or slightly below the maximum power demand of the PDM 420.

The PDM information 433 can be any information associated with the PDM 420. Such information can include, but is not limited to, formulas and/or algorithms, functional capabilities (number of output channels 423, power output of each output channel 423) of the PDM 420, physical location of the PDM 420, manufacturer of the PDM 420, age of the PDM 420, hours of operation of the PDM 420, and communication protocols of the PDM 420. The PDM information 433 can also include information about other PDMs that are communicably coupled to the PDM 420. The user preferences 434 can be any data associated the preferences of a particular user 450.

Examples of a storage repository 435 can include, but are not limited to, a database (or a number of databases), a file system, a hard drive, flash memory, some other form of solid state data storage, or any suitable combination thereof. The storage repository 435 can be located on multiple physical machines, each storing all or a portion of the electrical device information 432, PDM information 433, and/or the user preferences 434 according to some example embodiments. Each storage unit or device can be physically located in the same or in a different geographic location.

The storage repository 435 can be operatively connected to the control engine 480. In one or more example embodiments, the control engine 480 includes functionality to communicate with the user 450, the power source 410, and the electrical devices 408 in the system 400. More specifically, the control engine 480 sends information to and/or receives information from the storage repository 435 in order to communicate with the user 450, the power source 410, and the electrical devices 408. As discussed below, the storage repository 435 can also be operatively connected to the communication module 485 in certain example embodiments.

In certain example embodiments, the controller 490 compares the readings of the energy metering module 442, compare each reading with the maximum output for each associated output channel 423, and vary the output of the power transfer device 429 to the output channels 423 to improve the energy consumption efficiency of the electrical devices 408 that receive power from the PDM 420. The controller 490 can also control, directly or indirectly, a setting of one or more electrical devices so that none of the circuits fed by the output channels 423 of the PDM overload and/or fall out of compliance with any applicable industry safety standards.

The control engine 480 of the controller 490 can manage the electrical devices 408 being served by the PDM 420 so that, when the total demand at a point in time exceeds the maximum rating (e.g., 1000 W) of the output channels 423, the controller 490 can identify the electrical device 408 causing the surge, reduce the power delivered to one or more other electrical devices 408 to manage the overall power consumed by all of the electrical devices 408, and return the affected electrical devices 408 back to their normal, steady-state operating levels when the surge in power has ended.

In certain example embodiments, the control engine 480 of the controller 490 controls the operation of one or more components (e.g., the communication module 485, the transceiver 424) of the controller 490. For example, the control engine 480 can put the communication module 485 in "sleep" mode when there are no communications between the controller 490 and another component (e.g., an electrical device 408, the user 450) in the system 400 or when communications between the controller 490 and another component in the system 400 follow a regular pattern. In such a case, power consumed by the controller 490 is conserved by only enabling the communication module 485 when the communication module 485 is needed.

The control engine 480 can provide control, communication, and/or other similar signals to the user 450, the power source 410, and one or more electrical devices 408. Similarly, the control engine 480 can receive control, communication, and/or other similar signals from the user 450, the power source 410, and one or more electrical devices 408. The control engine 480 can control the PDM 420 or portions thereof (e.g., the power transfer device 429) automatically (for example, based on one or more algorithms stored in the PDM information 433 of the storage repository 435) and/or based on control, communication, and/or other similar signals received from a controller of another component of the system 400 through the communication links 406. The control engine 480 may include a printed circuit board, upon which the hardware processor 451 and/or one or more discrete components of the controller 490 can be positioned.

In certain example embodiments, the control engine 480 can include an interface that enables the control engine 480 to communicate with one or more components (e.g., communication module 485) of the PDM 420 and/or another component (e.g., an electrical device 408, a user 450) of the system 400. For example, if the electrical device 408 is a light fixture, and if the power transfer device 429 for the PDM 420 operates under IEC Standard 62386, then the output channel 423 can include a digital addressable lighting interface (DALI). In such a case, the control engine 480 can also include a DALI to enable communication with the power output channel 423 within the PDM 420. Such an interface can operate in conjunction with, or independently of, the communication protocols used to communicate between the controller 490 and the user 450, the power source 410, and an electrical device 408.

The control engine 480 can operate in real time. In other words, the control engine 480 of the controller 490 can process, send, and/or receive communications with the user 450, an electrical device 408, and/or the power source 410 as any changes (e.g., discrete, continuous) occur within the system 400. Further, the control engine 480 of the controller 490 can, at substantially the same time, control the PDM 420, the power source 410, and/or an electrical device 408 based on such changes.

In addition, the control engine 480 of the controller 490 can perform one or more of its functions continuously. For example, the controller 490 can continuously communicate electrical device information 432, PDM information 433, and/or any other information. In such a case, any updates or changes to such information (e.g., a change in power consumption measured by a power meter 442) can be used by the controller 490 in adjusting an output (e.g., current) sent by the power transfer device 429 to one or more output channels 423.

As yet another example, the control engine 480 can operate continuously to ensure that the total instantaneous power demand at any point in time is no greater than the maximum demand rating of the PDM 420. As yet another example, the control engine 480 can operate one or more of the switches 444 upon receiving a demand response signal from a user 450 in some form of electric utility (e.g., an electric transmission system operator, an electrical distribution system operator). In such a case, the control engine 480 can determine a reduced maximum demand rating of the PDM 420 to maintain compliance with the demand response request. Further, for as long as the demand response request remains in effect, control engine 480 can operate one or more of the switches 444 to ensure that the total instantaneous power demand is no greater than the reduced maximum demand rating of the PDM 420.

In some cases, rather than operating a switch 444, the controller 490 can control one or more portions (e.g., a DC/DC converter) of the power transfer device 429 and/or a POL control device associated with an electrical device 408. In other words, as an example, to merely reduce (rather than eliminate) the amount of power fed to an electrical device 408, the control engine 480 can adjust the output of a DC/DC converter that feeds power to an electrical device 408. As another example, the control engine 480 can send a control signal to a POL control device to require an electrical device 408 to consume a different amount of power from the PDM 420. In certain example embodiments, the control engine 480 of the controller 490 can operate (e.g., in real time) based on instructions received from a user 450, a change in power received from the power source 410, based on power consumed by one or more electrical devices 408, and/or based on some other factor. In addition, the control engine 480 (or other portion of the controller 490) can include the timer 488. In such a case, the timer 488 can measure one or more elements of time, including but not limited to clock time and periods of time. The timer 488 can also include a calendar in addition to clock functions.

In certain example embodiments, the control engine 480 of the controller 490 operates one or more of the switches 444 of the PDM 420. The control engine 480 can operate the switches 444 in a manner similar to what was described above with respect to FIG. 3. The control engine 480 (or other components of the controller 490) can also include one or more hardware and/or software architecture components to perform its functions. Such components can include, but are not limited to, a universal asynchronous receiver/transmitter (UART), a universal synchronous receiver/transmitter (USRT), a serial peripheral interface (SPI), a direct-attached capacity (DAC) storage device, an analog-to-digital converter, an inter-integrated circuit ($I^2C$), and a pulse width modulator (PWM).

In certain example embodiments, the communication module 485 of the controller 490 determines and implements the communication protocol (e.g., from the electrical device information 432 and the PDM information 433 of the storage repository 435) that is used when the control engine 480 communicates with (e.g., sends signals to, receives signals from) the user 450, the power source 410, and/or one or more of the electrical devices 408. In some cases, the communication module 485 accesses the electrical device information 432 and/or the PDM information 433 to determine which communication protocol is within the capability of the recipient of a communication sent by the control engine 480. In addition, the communication module 485 can interpret the communication protocol of a communication received by the controller 490 so that the control engine 480 can interpret the communication.

The communication module 485 can send data directly to and/or retrieve data directly from the storage repository 435. Alternatively, the control engine 480 can facilitate the transfer of data between the communication module 485 and the storage repository 435. The communication module 485 can also provide encryption to data that is sent by the controller 490 and decryption to data that is received by the controller 490. The communication module 485 can also provide one or more of a number of other services with respect to data sent from and received by the controller 490. Such services can include, but are not limited to, data packet routing information and procedures to follow in the event of data interruption.

The power module 412 of the controller 490 provides power to one or more other components (e.g., timer 488, control engine 480) of the controller 490. In certain example embodiments, the power module 412 receives power from the power transfer device 429. The power module 412 can include one or more of a number of single or multiple discrete components (e.g., transistor, diode, resistor), and/or a microprocessor. The power module 412 may include a printed circuit board, upon which the microprocessor and/or one or more discrete components are positioned. In some cases, the power module 412 can include one or more components that allow the power module 412 to measure one or more elements of power (e.g., voltage, current) that is delivered to and/or sent from the power module 412, The power module 412 can include one or more components (e.g., a transformer, a diode bridge, an inverter, a converter) that receives power (for example, through an electrical cable) from a source (e.g., the power transfer device 429) and generates power of a type (e.g., alternating current, direct current) and level (e.g., 12V, 24V, 470V) that can be used by the other components of the controller 490. The power module 412 can use a closed control loop to maintain a preconfigured voltage or current with a tight tolerance at the output. The power module 412 can also protect the rest of the electronics (e.g., hardware processor 451, transceiver 424) from surges generated in the line. In addition, or in the alternative, the power module 412 can be a source of power in itself to provide signals to the other components of the controller 490. For example, the power module 412 can be a battery. As another example, the power module 412 can be a localized photovoltaic power system.

The hardware processor 451 of the controller 490 executes software in accordance with one or more example embodiments. Specifically, the hardware processor 451 can execute software on the control engine 480 or any other portion of the controller 490, as well as software used by the user 450, the power source 410, and/or one or more of the electrical devices 408. The hardware processor 451 can be an integrated circuit, a central processing unit, a multi-core processing chip, a multi-chip module including multiple multi-core processing chips, or other hardware processor in one or more example embodiments. The hardware processor 451 is known by other names, including but not limited to a computer processor, a microprocessor, and a multi-core processor.

In one or more example embodiments, the hardware processor 451 executes software instructions stored in memory 443. The memory 443 includes one or more cache memories, main memory, and/or any other suitable type of memory. The memory 443 is discretely located within the controller 490 relative to the hardware processor 451 according to some example embodiments. In certain configurations, the memory 443 can be integrated with the hardware processor 451. In certain example embodiments, the controller 490 does not include a hardware processor 451. In such a case, the controller 490 can include, as an example, one or more FPGAs, one or more IGBTs, and/or one or more ICs. Using FPGAs, IGBTs, ICs, and/or other similar devices known in the art allows the controller 490 (or portions thereof) to be programmable and function according to certain logic rules and thresholds without the use of a hardware processor. Alternatively, FPGAs, IGBTs, ICs, and/or similar devices can be used in conjunction with one or more hardware processors 451.

The transceiver 424 of the controller 490 can send and/or receive control and/or communication signals. Specifically, the transceiver 424 can be used to transfer data between the controller 490 and the user 450, the power source 410, and/or the electrical devices 408. The transceiver 424 can use wired and/or wireless technology, using the communication links 406. The transceiver 424 can be configured in such a way that the control and/or communication signals sent and/or received by the transceiver 424 can be received and/or sent by another transceiver that is part of the user 450, the power source 410, and/or the electrical devices 408.

When the transceiver 424 uses wireless technology as the communication link 406, any type of wireless technology can be used by the transceiver 424 in sending and receiving signals. Such wireless technology can include, but is not limited to, Wi-Fi, visible light communication, cellular networking, and Bluetooth. The transceiver 424 can use one or more of any number of suitable communication protocols (e.g., ISA100, HART) when sending and/or receiving signals. Such communication protocols can be dictated by the communication module 485. Further, any transceiver information for the user 450, the power source 410, and/or the electrical devices 408 can be stored in the storage repository 435.

Optionally, in one or more example embodiments, the security module 428 secures interactions between the controller 490, the user 450, the power source 410, and/or the electrical devices 408. More specifically, the security module 428 authenticates communication from software based on security keys verifying the identity of the source of the communication. For example, user software may be associated with a security key enabling the software of the user 450 to interact with the controller 490, the power source 410, and/or the electrical devices 408. Further, the security module 428 can restrict receipt of information, requests for information, and/or access to information in some example embodiments.

By using the energy metering module 442 and the controller 490 of the PDM 420 as described herein, the PDM 420 deliver a greater amount of power to a greater number of electrical devices 408 coupled to the outlet channels 423 of the PDM 420. As a result, the system 400, running through the PDM 420, can operate much more efficiently, requiring fewer parts and materials for the increased operational output. Based on the information provided by the energy metering module 442, the controller 490 can determine the occurrence of one or more conditions (start-up of an electrical device 408, causing a spike in power consumption) within the system 400 and cause one or more other electrical devices 408 in the system 400 to operate at a different (e.g., decreased) output level until the condition stabilizes. Further, example embodiments can work "out of the box", without a user 450 having to input information, adjust settings, or otherwise manipulate the controller 490 and/or the PDM 420 before or during installation of the PDM 420 and/or an electrical device 408.

Figure 5:
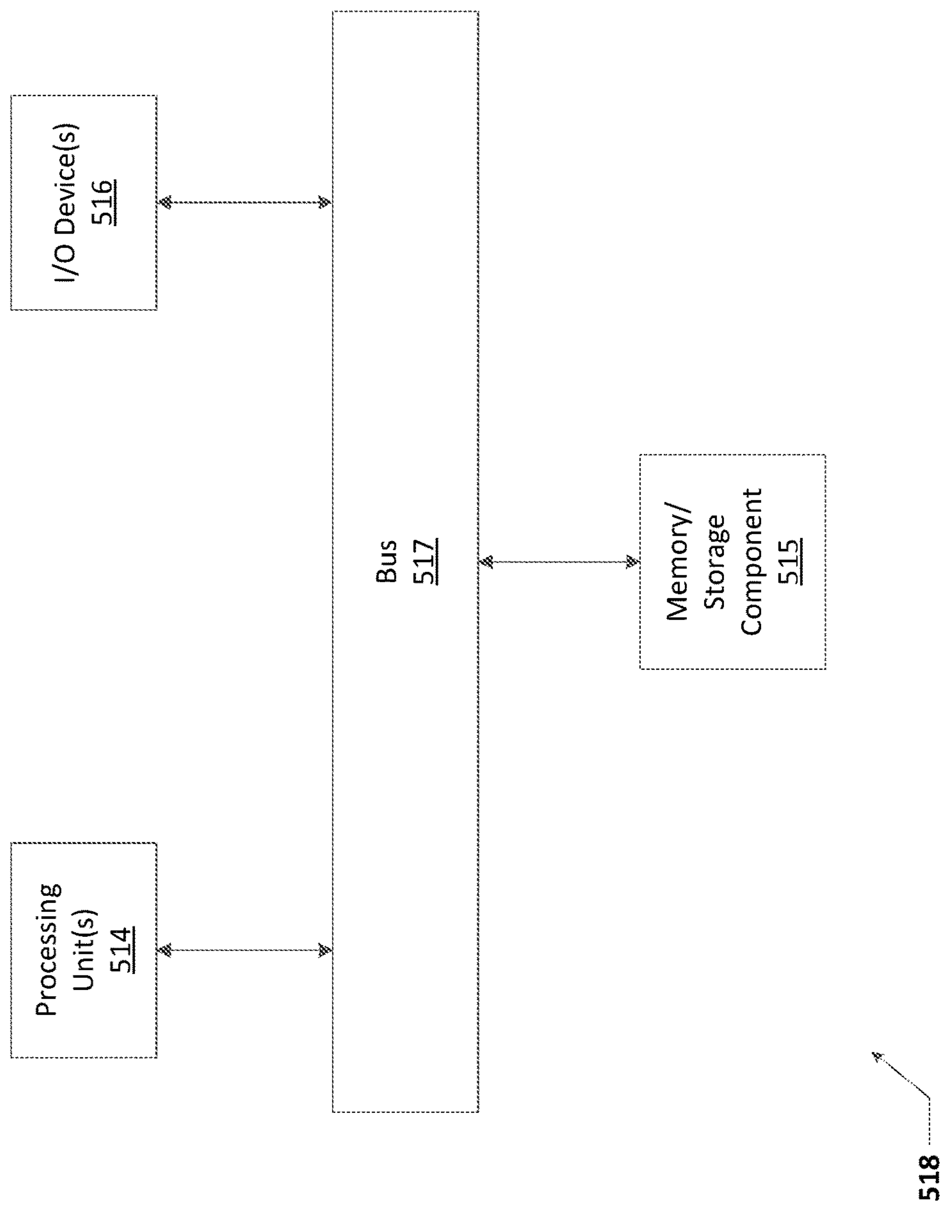
FIG. 5 shows a computing device in accordance with one or more example embodiments.

One or more of the functions performed by any of the components (e.g., controller 490) of an example PDM 420 can be performed using a computing device 518. An example of a computing device 518 is shown in FIG. 5. The computing device 518 implements one or more of the various techniques described herein, and which is representative, in whole or in part, of the elements described herein pursuant to certain example embodiments. Computing device 518 is one example of a computing device and is not intended to suggest any limitation as to scope of use or functionality of the computing device and/or its possible architectures. Neither should computing device 518 be interpreted as having any dependency or requirement relating to any one or combination of components illustrated in the example computing device 518.

Computing device 518 includes one or more processors or processing units 514, one or more memory/storage components 515, one or more input/output (I/O) devices 516, and a bus 517 that allows the various components and devices to communicate with one another. Bus 517 represents one or more of any of several types of bus structures, including a memory bus or memory controller, a peripheral bus, an accelerated graphics port, and a processor or local bus using any of a variety of bus architectures. Bus 517 includes wired and/or wireless buses.

Memory/storage component 515 represents one or more computer storage media. Memory/storage component 515 includes volatile media (such as random access memory (RAM)) and/or nonvolatile media (such as read only memory (ROM), flash memory, optical disks, magnetic disks, and so forth). Memory/storage component 515 includes fixed media (e.g., RAM, ROM, a fixed hard drive, etc.) as well as removable media (e.g., a Flash memory drive, a removable hard drive, an optical disk, and so forth).

One or more I/O devices 516 allow a customer, utility, or other user to enter commands and information to computing device 518, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 518 is connected to a network (not shown) (e.g., a local area network (LAN), a wide area network (WAN) such as the Internet, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 518 includes at least the minimal processing, input, and/or output means necessary to practice one or more embodiments.

Further, those skilled in the art will appreciate that one or more elements of the aforementioned computer device 518 is located at a remote location and connected to the other elements over a network in certain example embodiments. Further, one or more embodiments is implemented on a distributed system having one or more nodes, where each portion of the implementation (e.g., controller 490) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Example embodiments provide a number of benefits. Examples of such benefits include, but are not limited to, reduction in energy usage; more simplistic installation, replacement, modification, and maintenance of a system; qualification as a Class 2 device and/or system; compliance with one or more applicable standards and/or regulations; less need for licensed electricians; reduced downtime of equipment; lower maintenance costs, avoidance of catastrophic failure; increased flexibility in system design and implementation; prognosis of equipment failure; improved maintenance planning; and reduced cost of labor and materials. Example embodiments can also be integrated (e.g., retrofitted) with existing systems.

Example embodiments are electrically safe. Example systems or any portion thereof can be free from risk (or a greatly reduced risk) of fire or electrical shock for any user installing, using, replacing, and/or maintaining any portion of example embodiments. For example, the LV signals that feed a device can allow a user to maintain the device without fear of fire or electrical shock. While Class 2 systems and SELV/PELV/FELV are described above, example embodiments can comply with one or more of a number of similar standards and/or regulations throughout the world.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A power distribution module, comprising:

an input portion configured to receive high-voltage (HV) power from a power source;

a power transfer device electrically coupled to the input portion, wherein the power transfer device is configured to generate at least one low-voltage (LV) signal using the HV power;

an output section electrically coupled to the power transfer device and comprising a plurality of output channels, wherein each output channel of the plurality of output channels of the output section is configured to deliver the at least one LV signal for use by at least one electrical device;

at least one switch disposed between the output section and the power transfer device, wherein the at least one switch has an open position and a closed position, wherein the at least one LV signal flows from the power transfer device to the output section when the at least one switch is in the closed position, and wherein the at least one LV signal is prevented from flowing from the power transfer device to the output section when the at least one switch is in the open position; and a controller communicably coupled to the at least one switch, wherein the controller is configured to:

determine a total power demand of the output section, wherein the total power demand comprises an actual demand of the at least one electrical device for each output channel at a first time;

determine that the total power demand is greater than a rated capacity of the output section; and operate the at least one switch between the closed position and the open position to adjust the actual demand to an adjusted actual demand so that the adjusted actual demand falls below the rated capacity at the first time.

2. The power distribution module of claim 1, wherein the power transfer device comprises at least one alternating current-to-direct current (AC/DC) converter and at least one direct current-to-direct current (DC/DC) converter.

3. The power distribution module of claim 1, wherein each output channel of the plurality of output channels has a peak power demand that corresponds to the at least one electrical device coupled to each output channel.

4. The power distribution module of claim 1, wherein the controller comprises an energy metering module that measures the actual demand of each output channel of the plurality of output channels of the output section.

5. The power distribution module of claim 4, wherein the controller operates the at least one switch based on measurements made by the energy metering module at the first time.

6. The power distribution module of claim 5, wherein the controller further operates the at least one switch based on the adjusted actual demand relative to the rated capacity at a second time.

7. The power distribution module of claim 6, wherein operating the at least one switch reduces an amount of power delivered to the at least one electrical device of at least one output channel.

8. The power distribution module of claim 1, wherein operating the at least one switch cuts off power delivered to the at least one electrical device of at least one output channel.

9. The power distribution module of claim 1, wherein each output channel of the output section is configured to receive an electrical cable, wherein the electrical cable is coupled to the at least one electrical device.

10. The power distribution module of claim 9, wherein the electrical cable is a Class 2 cable.

11. A distributed low voltage power system, comprising:
a power source generating line voltage power;
a line voltage cable comprising a first line voltage end and a second line voltage end, wherein the first line voltage end is coupled to the power source, wherein the line voltage power flows through the line voltage cable;
a power distribution module (PDM) coupled to the line voltage cable, wherein the PDM comprises:
at least one input channel coupled to the second line voltage end of the line voltage cable;
a power transfer device electrically coupled to the at least one input channel, wherein the power transfer device receives the line voltage power from the at least one input channel, wherein the power transfer device generates a first low-voltage (LV) signal from the line voltage power;
at least one first output channel coupled to the power transfer device, wherein the at least one first output channel receives the first LV signal from the power transfer device; and
a controller operatively coupled to the power transfer device and the at least one first output channel, wherein the controller:
determines a total power demand of the at least one first output channel, wherein the total power demand comprises an actual demand of at least one first electrical device coupled to the at least one first output channel;
determines that the total power demand is greater than a rated capacity of the at least one first output channel; and
operates at least one switch between a closed position and an open position to reduce a first amount of the first LV signal to adjust the actual demand to a first adjusted actual demand so that the first adjusted actual demand falls below the rated capacity; and
the at least one first electrical device coupled to the at least one first output channel, wherein the at least one first electrical device operates using a first adjusted amount of the first LV signal.

12. The distributed low voltage power system of claim 11, further comprising:
a LV cable comprising a first LV end and a second LV end, wherein the first LV end is coupled to the first output channel of the PDM, and wherein the second end is coupled to the at least one first electrical device, wherein the at least one first electrical device receives the first LV signal from the first PDM through the LV cable.

13. The distributed low voltage power system of claim 11, further comprising:
at least one second electrical device coupled to at least one second output channel, wherein the at least one second electrical device operates using a second amount of a second LV signal generated by the first PDM, wherein the controller:
determines a second total power demand of the at least one second output channel;
determines that the second total power demand is greater than the rated capacity of the at least one second output channel; and
operates the at least one switch between the closed position and the open position to reduce the second amount of the second LV signal to adjust the actual demand to a second adjusted actual demand so that the second adjusted actual demand falls below the rated capacity.

14. The distributed low voltage power system of claim 13, wherein the controller, by operating the at least one switch, adjusts the first amount of the first LV signal in a first direction when the second amount of the second LV signal is adjusted in a second direction, wherein the first direction is opposite the second direction.

15. The distributed low voltage power system of claim 11, wherein the controller further monitors an entire load coupled to the at least one first output channel and controls the first LV signal generated by the power transfer device based on monitoring the entire load.

16. The distributed low voltage power system of claim 11, wherein the first LV signal is direct current power.

17. The distributed low voltage power system of claim 11, wherein the at least one first electrical device qualifies as a Class 2 device.

18. The distributed low voltage power system of claim 11, wherein the at least one first electrical device is used for lighting applications.

19. The distributed low voltage power system of claim 11, wherein the at least one switch is disposed between the at least one first output channel and the power transfer device of the PDM, wherein the at least one LV signal flows from the power transfer device to the at least one first output channel when the at least one switch is in the closed position, and wherein the at least one LV signal is prevented from flowing from the power transfer device to the at least one first output channel when the at least one switch is in the open position.

20. A controller comprising:
an energy metering module configured to measure at least one power parameter associated with at least one electrical device; and
a control engine coupled to the energy metering module, wherein the control engine is configured to:
determine, as measured by the energy metering module, a total power demand of an output section of a power distribution module (PDM), wherein the total power demand comprises an actual demand of a plurality of electrical devices coupled to the output section of the PDM;
determine that the total power demand is greater than a rated capacity of the output section of the PDM; and
operate, based on the at least one power parameter measured by the energy metering module, at least one switch between a closed position and an open position to reduce an amount of power delivered to the output section of the PDM so that the actual demand falls below the rated capacity.

* * * * *